United States Patent [19]
Awrey

[11] 3,724,273
[45] Apr. 3, 1973

[54] PIPELINE SEALING DEVICE

[75] Inventor: Kenneth D. Awrey, Prince George, British Columbia, Canada

[73] Assignee: Westcoat Transmission Company Limited, Vancouver, British Columbia, Canada

[22] Filed: June 30, 1971

[21] Appl. No.: 158,329

[30] Foreign Application Priority Data

Feb. 12, 1971    Canada..................................105240

[52] U.S. Cl..................................................73/389
[51] Int. Cl..................................................G01l 9/00
[58] Field of Search ............73/389, 388; 138/93, 97

[56] References Cited

UNITED STATES PATENTS 3,537,483    11/1970    Teague, Jr..............................138/93

Primary Examiner—Donald O. Woodiel
Attorney—Harold A. Weir et al.

[57] ABSTRACT

A method and apparatus for sealing operational gas pipelines so that sections of the pipe can be removed and replaced. A sealing plate provided with an inflatable circumferential member is inserted into each of the open ends of the pipeline after a defective section has been removed. By careful manipulation of purge devices and manometers mounted on the sealing plates gas pressure behind the sealing plates can be controlled to avoid hazardous gas/air mixtures in the pipeline so that fire welding can be undertaken without the need for gas or air purging either before or after completion of the welding. One end of the new section is welded in position with the seal in place, which seal is then withdrawn by means of a built-in withdrawal and deflating device.

6 Claims, 3 Drawing Figures

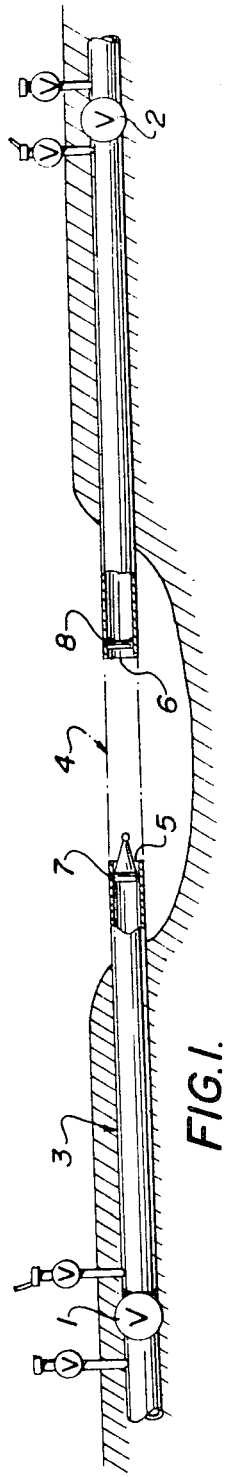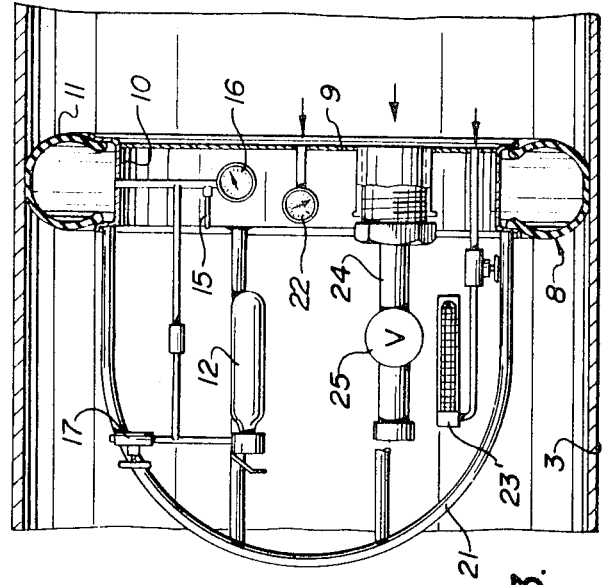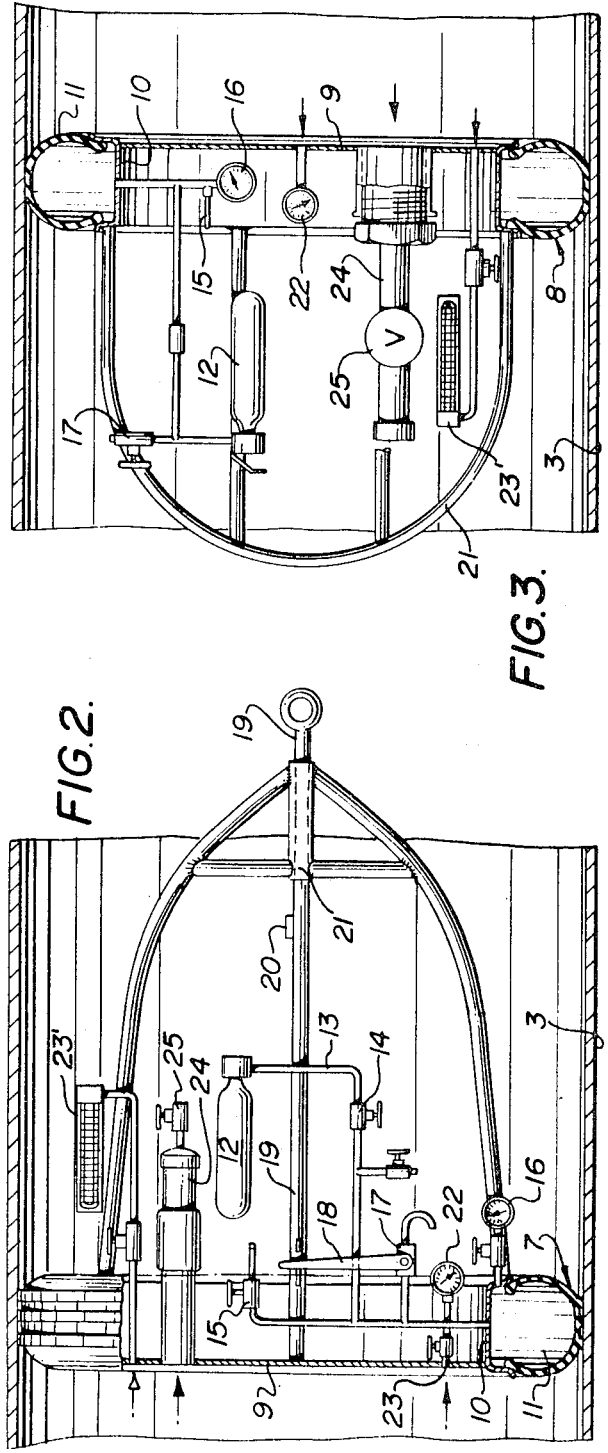

PIPELINE SEALING DEVICE

This invention relates to a method and apparatus for sealing operational gas pipelines, particularly natural gas pipelines, so that defective sections of the pipeline can be removed and new sections welded into their place. More particularly, the invention is concerned with the provision of a sealing plate having an inflatable rim which can be inflated in situ to provide a positive gas seal between the plate and the walls of the pipeline, and which sealing plate is provided with pressure measuring means such as pressure gauges and manometers, and pressure relief or purge valves so that pressure in the pipeline can be controlled and dangerous air/gas mixtures eliminated.

As is well known when a repair is required in an operating natural or other gas pipeline, gas flow through the affected section is shut off by means of block valves on each side of the affected section. By the nature of the installation, the two block valves may be as much as 30 miles apart, and although possible, it is highly unlikely that all sections of the pipeline between the two block valves or even the block valves themselves will be at the same elevational level, so that pockets of gas will remain in the pipeline even after shut off and bleed off of the gas to a pressure less than 1/10 percent of an inch of water. Such gas pockets can cause dangerously explosive gas/air mixtures with the air which seeps into the open pipeline, during weld preparation of the ends, which mixtures can easily be ignited by the welding operations necessary to replace the defective pipe section. It is also known that natural gas (for example) is lighter than air and will naturally tend to rise to the highest point in the pipeline. Thus, assuming the defective section to be on a sloping section of pipeline, which assumption will cover the vast majority of situations, the low side of the cut will have a positive gas pressure and the high side of the cut will have a low or negative gas pressure. Normally, the weld on the low side of the cut is the first to be made because the residual gas due to the elevation head is a ready source of gaseous fuel for the welding torch, and in fact may be the only gas source available. Inflatable sealing devices have been used in the past to seal off the open ends of the pipes but all of such sealing devices have their attendant disadvantages. Representative of the inflatable devices of the prior art are those described in U.S. Pat. No. 3,381,714 to Johnson, issued May 7, 1968, and U.S. Pat. No. 3,483,895 to Barto, issued Dec. 16, 1969.

Existing inflatable seals normally consist of latex rubber bags, inflated with nitrogen to about 2 ½ psi. pressure and protected from abrasion and other mechanical damage by an outer canvas bag. This type of bag suffers from the disadvantage that there is always a slow leakage of gas past the seal with an attendant fire and explosion hazard. Attempts have been made to alleviate this problem by coating the outer bag with drilling mud and packing extra mud around the circumference of the seal to effect positive closure. This is, of course, time consuming, relatively expensive, because it involves considerable equipment and such "extras" as antifreeze solution for use in sub-freezing conditions, and furthermore promotes rotting, mildew and general deterioration of the canvas cover bags. Further, because of the relatively low pressure in the bags (2 ½ psi maximum), there is little or no safety margins should a bag develop a leak, nor is there sufficient pressure on the wall of the pipe effecting the positive seal to withstand an unusual build up of pressure or vacuum within the pipe, with the possibility of a blow out of the seal.

Using the prior art bags the procedure was normally to reduce gas pressure between the upper and lower block valves to less than one-tenth inch water gauge, cut out the defective section, install bag seals at each open end, together with a compression cross on the low side to give a visual indication of an impending blow out, prepare both ends of the pipeline for welding by grinding, remove the lower seals and weld in the lower end of the new section, remove the upper seal and weld in the upper end of the new section. Subsequently, it was necessary to completely gas purge the entire length between the two block valves to remove the air which is admitted during the replacement operations. As previously noted, the distance between block valves may be as much as 30 miles and as the purge may take up to about 45 minutes to complete in addition to using a volume of gas equal to between three and four times the volume of the pipeline, it is costly and results in unnecessarily long down time.

It is, therefore, an object of the present invention to provide an improved method for replacing defective sections in operating gas lines.

Another object is to provide a novel pipe line seal which overcomes the disadvantages of the prior art and affords a positive gas tight seal which can easily be removed from the pipeline at any time.

I have found that the objects of the invention may be achieved by providing a sealing device comprising a gas impermeable body member having mounted thereof a circumferential inflatable member adapted to be inserted into a pipeline when said inflatable member is deflated, means mounted on said body member to inflate the inflatable member when said device is located in a pipeline whereby a positive seal between the inflatable member and the pipeline is achieved, pressure measuring means mounted on the body member to measure pressure in the pipeline behind the sealing device, purge means through the body member so that gas may be withdrawn under control from the pipeline, and means to deflate the inflatable member. The novel sealing devices may be inserted into a pipeline in which gas pressure is reduced to a nominal level and a section removed therefrom, to seal the two open ends. Both ends of the pipeline are prepared for welding and the first joining weld is performed with both seals in situ, under a condition of slight positive gas pressure behind the adjacent seal. The other seal is then opened and the pipeline gas purged to provide a slight positive gas pressure against the other seal. Both seals are then removed and the second joining weld is completed. Post weld purging of the pipeline to remove air is not normally required.

Other objects and advantages of the present invention will become more apparent upon consideration of the detailed description which follows in conjunction with the drawings, in which:

FIG. 1 is a sketch showing the location of a replacement section in a pipeline between two block valves;

FIG. 2 is a perspective view of one form of the seal of the present invention; and FIG. 3 is a perspective view of a second form of the seal of the present invention.

As previously noted, block valves 1 and 2 in a pipeline 3 are generally widely spaced and at different elevational levels, so that if a section 4 is removed, after the valves 1 and 2 have been closed and pressure reduced to about one-tenth inch of water or less, residual gas, being lighter than air, tends to build up adjacent open end 5 of the pipeline 3 and adjacent blocking valve 2. Zero or negative gas pressures are recorded at blocking valve 1 and open end 6 of the pipeline. It is therefore necessary to employ seals at ends 5 and 6. Normally, a replacement section 4 is first welded to open end 5, because residual gas adjacent thereto can be employed as fuel for the welding torch. The weld is made with the seal in situ and hence this seal, hereinafter designated seal 7 is of slightly different construction to the seal closing open end 6 and hereinafter designated seal 8. Seal 7 is set sufficiently far from the open end 5 so that it is not affected by the heat generated by the welding operations, usually about 40 feet is sufficient for this purpose, and is provided with a withdrawal means, such as a chain, so that it can be withdrawn along pipeline 3 and replacement section 4 after completion of the welding at the face open end 5. Seal 8 is normally located at open end 6 and consequently does not require the withdrawal device.

Considering now FIG. 2 in detail which shows seal 7 in the inflated condition. The seal 7 comprises a metal plate member 9 having an integral rim 10 into which rim an inflatable member 11 is fitted. Normally, metal plate member 9 is circular and fabricated from approximately one-eighth inch thick steel plate and the inflatable member is an automotive tire, preferably of the tubeless type. It will, of course, be understood that for special shapes or sizes of pipe sections other than circular may be employed and that the present invention is not limited to circular section pipelines. I have found that for use in a 30 inch pipe, a 650 × 16 inch 4 ply nylon front wheel tractor tire having a plurality of longitudinal circumferental ribs is ideal. The tire may be inflated in situ by means of a carbon dioxide cylinder 12 connected to the tire by a pressure line 13 and valve 14. An "Ansul" (Trademark) 30 lb. $CO_2$ cartridge is suitable to inflate the 650 × 16 inch tire to about 40 – 43 psi. A pressure relief valve 15 and a tire pressure gauge 16 may be provided as desired. A deflating valve 17 connected to a lever 18 and withdrawal arm 19, is also provided. As the arm 19 is withdrawn to engage stop 20 with a frame member 21, the lever 18 opens valve 17 and exhausts the tire to atmosphere.

In order that pressure or vacuum in the pipeline behind the seals 7 and 8 may be measured a pressure gauge 22 with an associated shut off valve 23 is provided, normally reading from 0–15 psig. This gauge used as a secondary indication of pressure as normally welding is only conducted when the pressure in the pipeline is below one-tenth inch of water, and the gauge is insufficiently accurate to indicate pressures of this small magnitude. At low pressures or vacuums primary reliance is placed on a manometer 23', which reads to approximately 5 inches of water, to measure the pressure or vacuum in the pipeline adjacent the respective seal 7 or 8. Purge lines 24 are welded to the plate, complete with vent valves 25, so that gas may be vented from behind the seals 7 or 8 when the pressure in the pipeline exceeds about 2 psig., in the manner described more fully hereinafter. Seal 8 is shown in FIG. 3, and is identical to seal 7 in operation except that arm 19 is omitted together with deflating valve 17 and lever 18. Manual deflating valve 15 only is provided as seal 8 is only located at the open end 6 of the pipe and remote deflation is not required.

The mode of operation using the novel seals of the present invention comprises the following steps, subsequent to the identification of a defective length of pipe in an operating pipeline. It will, of course, be appreciated that the defective pipe may vary in length from a few feet to several hundred feet or more but in every case the procedure is the same. The defective section is isolated between two block valves 1 and 2 and gas pressure between the two block valves is reduced to below about one-tenth inch water by conventional techniques well known to those skilled in the art. The defective section is then removed, again by conventional techniques. Seal 7 is then placed in the "low side" open end of the pipeline and seal 8 is placed in the "high side" open end of the pipeline as shown in FIG. 1. Seal 7 is inserted up to about 40 feet from face 5, to ensure that it is not affected by welding heat, and is inflated by means of a $CO_2$ cartridge, to about 10 – 43 psi. The pressure in the pipeline is checked on the manometer and, if necessary, reduced to one-tenth inch water by opening the purge valve 25, after which the valve 25 is closed. The end 5 is then prepared for welding by grinding and other conventional steps and then replacement section 4 is clamped into place and welded on. This procedure results in a considerable time saving because this weld may be carried out immediately, without taking time for gas control as in the prior art. As fire welds are relatively difficult, even for skilled welders, the weld repairs on stringer beads are much higher than on a normal cold pipeline production weld. On completion of the stringer bead, an internal inspection, not possible with the prior art procedure, can be carried out to locate any repairs necessary at this early stage of welding. Such repairs can be quickly and easily carried out, even by internal back welding so that the x-ray quality of the weld can be assured. Such assurance saves considerable time previously necessary to re-X-ray after completion as experience has shown that it is in the first stringers that defects requiring repair are most likely to occur.

Using the prior art procedures no work could be undertaken on the second weld at face 6 while work was in progress at face 5 and hence the total downtime was increased by about 45 minutes, the time taken to clamp the first end and complete two or three welding passes. The procedure of the present invention is so designed that work may be conducted simultaneously on both welds. As soon as seal 7 is in position, seal 8 is placed adjacent the open end face 6 and the tire inflated as in the case of seal 7. As described hereinbefore, seal 8 is provided with a purge valve 25 and a manometer 23' to read very low pressures and vacuums accurately. As will be appreciated, seal 8 is on the "high side" of the replacement tie in, and the manometer will read a vacuum because the residual gas in the pipeline will migrate to the end adjacent block valve 2 whereat a positive pressure will be registered. In the prior art procedure, end 6 would be prepared for welding and then both seals 7 and 8 would be removed. The head of gas behind seal 7 being sufficient to drive the air entering end 6 sufficiently past the end 6 to enable the second finishing weld to be made safely. Subsequently, a complete purge between block valves 1 and 2 was necessary to remove the entrained air. Now, however, the purge is unnecessary because ingress of air can be substantially eliminated. As soon as the actual vacuum registered on the manometer of seal 8 has been noted gas is pumped into the pipeline from block valve 2 with the purge valve 25 on seal 8 open until a slight positive pressure or zero pressure is recorded on the manometer. Gas flow is continued for up to about 30 minutes, while welding is completed on end 5, so as to ensure a good air purge adjacent end 6. As seal 8 can very quickly be installed very little air in fact ever enters the pipeline. Purge valve 25 can then be closed and the slight positive pressure at end 6 maintained by bleed off or gas injection at block valve 2 as necessary. Weld preparation on end 6 is then completed by grinding and the like in conventional manner.

As soon as the welding at end 5 is complete, excess gas pressure behind seal 7 is bled off via the purge valve to ensure that the seal is not violently ejected when the tire is deflated. The purge line valve may be connected to withdrawal arm 19 in the same manner as pressure valve 17 so that as the cable attached to arm 19 is tightened so the purge valve 25 opens and releases the pressure build up. As soon as pressure behind the seal is released valve 17 is opened by movement of arm 19 and the tire 11 deflates, releasing its grip on the walls of the pipeline, so that the seal 8 can be withdrawn down the pipeline and through the welded-in replacement section 4. Seal 8 is removed by deflating its tire 11 by operation of a manual deflating valve 15, the pipe ends are clamped into position and the second or fire weld is made in conventional manner to complete the tie-in of the replacement section. Gas control is substantially complete and fire or explosion risk at the site of the second weld is minimized. Because air has been precluded from the pipeline throughout the welding operations an air purge is not required and the pipeline can be returned to service immediately, thereby avoiding an additional 45 or more minute purge down time.

Not only does the novel seal and operating procedure result in shorter down time, but also, and more importantly, the new procedure improves the safety factor in conducting what has long been regarded as a hazardous operation. Fire and explosion risk caused by an air/gas mixture in the presence of fire welding is substantially reduced.

I claim:

1. A gas pipeline sealing device comprising: a gas impermeable body member having mounted thereon a circumferential inflatable member adapted to be inserted into a pipeline when said inflatable member is deflated, means to inflate said inflatable member when said device is located in said pipeline whereby a positive seal between said inflatable member and said pipeline is achieved, pressure measuring means on said body member whereby pressure in said pipeline behind said sealing device may be measured, purge means through said body member whereby gas in said pipeline behind said sealing device may be withdrawn, and means to deflate said inflatable member.

2. A gas pipeline sealing device as claimed in claim 1, wherein said pressure measuring means comprise a manometer means measuring up to 5 inches water and a pressure gauge measuring 0 – 15 psig.

3. A gas pipeline sealing device as claimed in claim 1, including means to measure pressure in said inflatable member.

4. A gas pipeline sealing device as claimed in claim 1, including withdrawal means rigidly mounted on said body member to withdraw said device from said pipeline after deflation of said inflatable member.

5. A gas pipeline sealing device as claimed in claim 1, including a withdrawal member secured to said body member and operably connected to said deflating means such that upon application of withdrawal force to said withdrawal member said deflating means is actuated and said positive seal is broken thereby enabling withdrawal of said device.

6. An apparatus as claimed in claim 1, wherein said means to inflate said inflatable member comprises a gas cylinder mounted on said body member and operatively connected to said inflatable member.

* * * * *